United States Patent [19]

Van Berkum

[11] 4,006,710

[45] Feb. 8, 1977

[54] ARTISTIC BED FOR AQUARIUMS AND THE LIKE

[76] Inventor: Katherine A. Van Berkum, 25 Emerald Lane, Omro, Wis. 54963

[22] Filed: July 25, 1975

[21] Appl. No.: 599,168

[52] U.S. Cl. .................................................. 119/5
[51] Int. Cl.² ..................................... A01K 64/00
[58] Field of Search .............. 119/5; 35/26; 428/14; 156/63; 264/245

[56] References Cited

UNITED STATES PATENTS

| | | | |
|---|---|---|---|
| 178,308 | 6/1876 | Leathers et al. | 264/245 |
| 537,703 | 4/1895 | Mueller | 264/245 |
| 2,491,853 | 12/1949 | Feldman | 119/5 |

*Primary Examiner*—Hugh R. Chamblee
*Attorney, Agent, or Firm*—Andrus, Sceales, Starke & Sawall

[57] ABSTRACT

A multi-chambered form is provided which is placed in the bottom of an empty aquarium or the like. The chambers are arranged in a desired configuration. Particulate material is then poured into each chamber individually, with a different material type and/or color used for adjacent chambers. When the chambers are filled to the desired level, water is carefully and slowly poured into the aquarium. Subsequently, the form is removed upwardly from the bed through the water, leaving the artistic design intact.

3 Claims, 7 Drawing Figures

ARTISTIC BED FOR AQUARIUMS AND THE LIKE

BACKGROUND AND SUMMARY OF THE INVENTION

This invention relates to an artistic bed for aquariums and like containers.

Many transparent aquariums, whether they are of small fishbowl size or large tank-like dimensions, are preferably provided with a bed of sand, coral or other equivalent particulate material for purposes of supporting plants, collecting debris, etc. Heretofore, such beds have comprised a material of a single type or color, or intimate mixtures thereof, throughout the extent of the bed. Thus, the appearance of the bottom of the aquarium has been visually uniform.

The present invention is based on the discovery that it is possible to provide an artistically arranged bed which has a plurality of selectively arranged materials and/or colors to thereby provide a pleasing and interesting design which enhances the beauty of the container.

In accordance with the invention, a multi-chambered form is provided which is placed in the bottom of an empty aquarium or the like. The chambers are arranged in a desired configuration. Particulate material is then poured into each chamber individually, with a different material type and/or color used for adjacent chambers. When the chambers are filled to the desired level, water is carefully and slowly poured into the aquarium, Subsequently, the form is removed upwardly from the bed through the water, leaving the artistic design intact.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
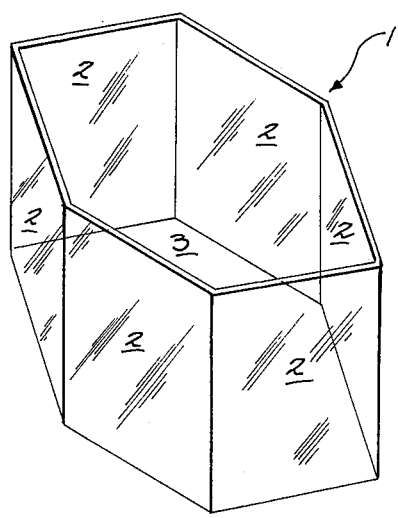
FIG. 1 is a perspective view of an empty hexagonal aquarium usable with the concept of the invention.

The concept of the invention may be utilized with containers of various sizes and shapes. For purposes of illustration, FIG. 1 shows an aquarium 1 of generally hexagonal shape and having side walls 2, a bottom 3 and an open top.

Figure 2:
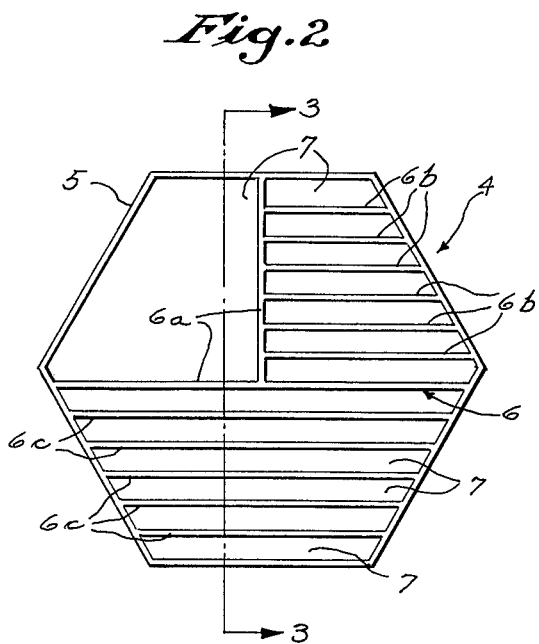
FIG. 2 is a top plan view of a form for creating the artistic designs.
Figure 3:
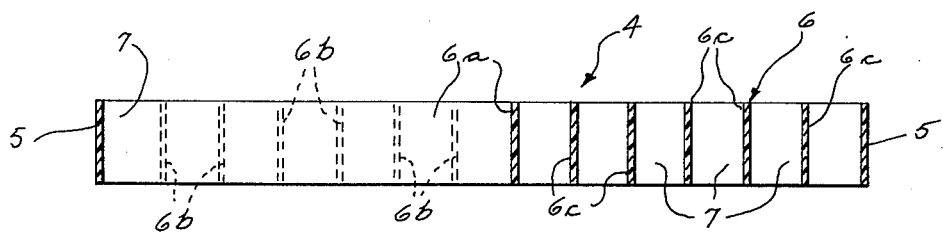
FIG. 3 is a transverse section of the form taken on line 3—3 of FIG. 2.

It is desired to create an artistic design in the bottom of aquarium 1. For this purpose, and as best shown in FIGS. 2 and 3, a thin-walled form 4 of plastic or the like is provided. Form 4 comprises an outer peripheral edge wall 5 and a plurality of interior walls 6 which selectively intersect and/or connect with wall 5. Any desired wall arrangements may be utilized. In the present instance, the arrangement is for a stylized American flag. For this purpose, a right angle interior wall 6a connects to two sides of wall 5. Several straight walls 6b connect between wall 6a and the opposite portion of wall 5, while numerous other straight walls 6c connect to wall 5 across the form. Walls 5 and 6 form suitable chambers 7 open at both the bottom and top.

Figure 4:
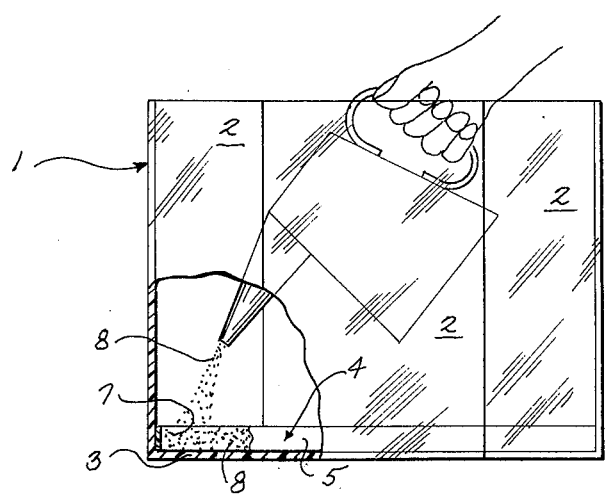
FIG. 4 is a side elevation of the aquarium having the form placed therein, and showing the addition of particulate material.

According to the concept of the invention, and as shown in FIG. 4, form 4 is then manually placed within aquarium 1 so that it is in a generally horizontal position with its bottom edge resting on bottom 3, and preferably with peripheral wall 5 generally coinciding with the periphery of bottom 3. Particulate material 8 of different types and/or colors is then poured individually into each chamber 7 until the chambers are filled to the desired level, preferably slightly below the top form edge to maintain a complete separation of the design portions.

Figure 5:
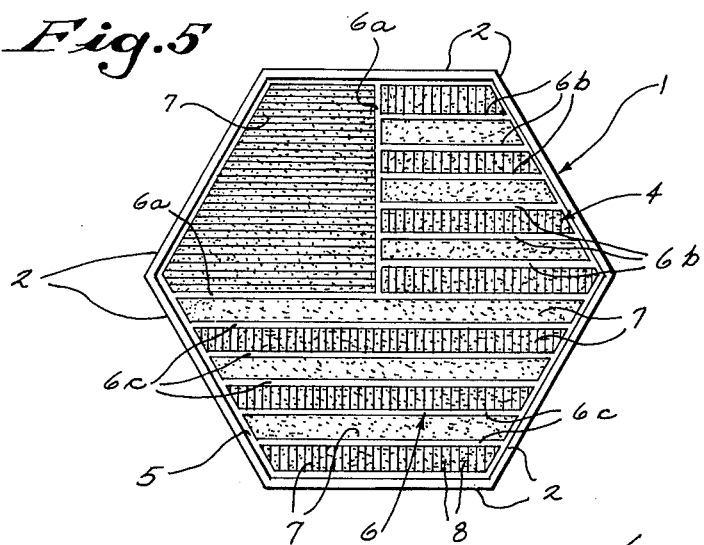
FIG. 5 is a top plan view of the aquarium after the material has been added.

FIG. 5 shows the filled form and, in the case of the illustrated stylized flag, with the clear portions representing white material the vertically shaded portions representing red material and the horizontally shaded portion representing blue material.

Figure 6:
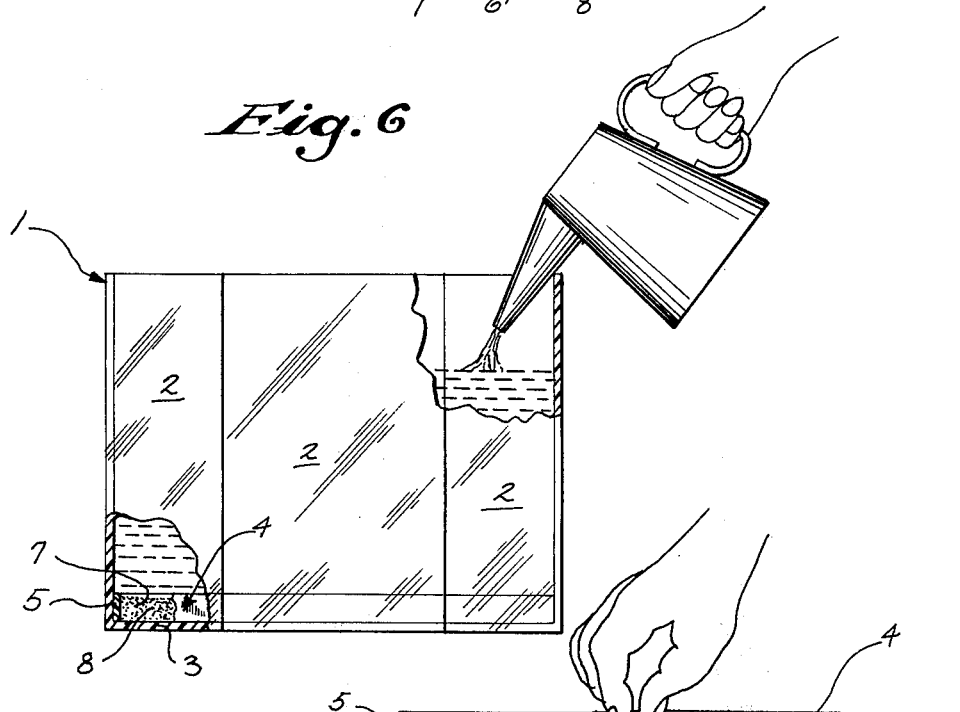
FIG. 6 is a side elevation of the aquarium and showing the addition of water.
Figure 7:
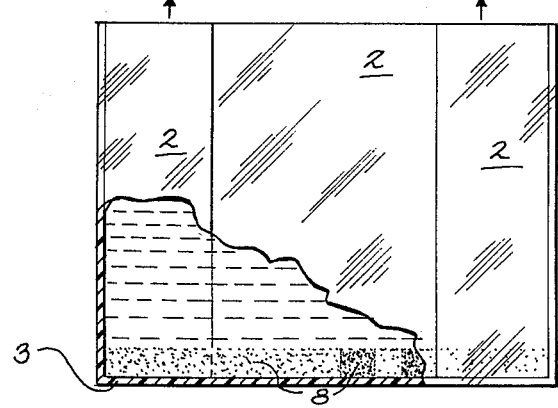
FIG. 7 is a view similar to FIG. 6 and showing removal of the form.

At this point, the material is normally still relatively loose and flowable so that removal of form 4 would cause the material to lose its delineation and run together. Therefore, it is preferable that water first be poured slowly into the container until it is filled to the desired level, as shown in FIG. 6. At this point, material 8 will become water-saturated and will have increased cohesiveness and reduced flowability. The form may then be carefully removed upwardly from the saturated bed and through the water, as in FIG. 7, leaving the design intact and with each particulate portion substantially separate.

While the concept of the invention has been described primarily in connection with aquariums, it may possibly be applied to other containers having particulate material on the bottom without departing from the spirit of the invention.

Various modes of carrying out the invention are contemplated as being within the scope of the following claims particularly pointing out and distinctly claiming the subject matter which is regarded as the invention.

I claim:

1. The method of forming an artistic bed in an aquarium, comprising the steps of:
   a. providing a thin-walled form having a peripheral edge wall and a plurality of interior walls forming separate chambers open at the top and bottom,
   b. placing said form on the bottom of an empty aquarium,
   c. pouring flowable materials of different types and/or colors into each chamber until the material fills the chamber to slightly below the top edge of said form to create the bed design with the portions of the latter maintained separate,
   d. subsequently pouring water into said aquarium to thereby increase the cohesiveness and reduce the flowability of said materials by water saturation,
   e. and subsequently removing said form upwardly from the saturated bed and through the water so that the design remains intact.

2. The method of claim 1 in which said form is placed on the bottom of said aquarium so that its peripheral edge will generally coincide with the periphery of the said aquarium bottom.

3. An aquarium comprising:
   a. a container,
   b. and a bed of particulate material on the bottom of said container, with said bed being formed in accordance with the method of claim 1.

* * * * *